United States Patent [19]

Sacks et al.

[11] Patent Number: 4,618,528
[45] Date of Patent: Oct. 21, 1986

[54] POLYMER FILMS CONTAINING PLATELET PARTICLES

[75] Inventors: William Sacks, Gillette; John P. Sibilia, Livingston; Abraham M. Kotliar, Westfield, all of N.J.; Harold D. Oltmann; Shu P. Chen, both of Baton Rouge, La.

[73] Assignee: Allied Corporation, Morris Township, Morris County, N.J.

[21] Appl. No.: 709,264

[22] Filed: Apr. 15, 1985

Related U.S. Application Data

[62] Division of Ser. No. 405,225, Aug. 5, 1982, Pat. No. 4,528,235.

[51] Int. Cl.[4] .................. B32B 7/02; B32B 5/16; B32B 27/34
[52] U.S. Cl. .................................. 428/216; 428/220; 428/331; 428/474.4
[58] Field of Search .............. 428/474.4, 476.9, 220, 428/331, 323, 215, 216; 264/211

[56] References Cited

U.S. PATENT DOCUMENTS 3,663,260  5/1972  Poppe et al. ................. 428/331
3,903,234  9/1975  Ikeda et al. .................. 264/211
3,949,114  4/1976  Viola et al. .................. 428/476.9
4,082,880  4/1978  Zboril ........................ 428/220
4,369,222  1/1983  Hedrick et al. .............. 428/474.4

OTHER PUBLICATIONS

Arina et al, Mineral Fillers in Low Density-Polyethylene Films, Helsinki University of Technology.
Abstract of French Pat. No. 1299089, 7-1962.
Abstract of Great Britain Pat. No. 1136350, 12-1968.

Primary Examiner—Thomas J. Herbert
Attorney, Agent, or Firm—Richard A. Negin

[57] ABSTRACT

Thin polymer films containing small sized platelet type filler. The polymer has a melt index of from 0.01 to 10 grams per 10 minutes at 190° C. to 250° C. as measured on ASTM Test No. D-1238 at a load of 1000 to 2160 grams. The preferred polymer is polycaprolactam or high density polyethylene. There is from 10 to 50 percent of a platelet filler having an average equivalent diameter of from 1 to 8 micrometers, a maximum equivalent diameter of about 25 micrometers, and an average thickness of less than 0.5 micrometers. The preferred filler is talc. The film is from 10 to 100 micrometers thick and can be a single ply or a laminate.

11 Claims, 1 Drawing Figure

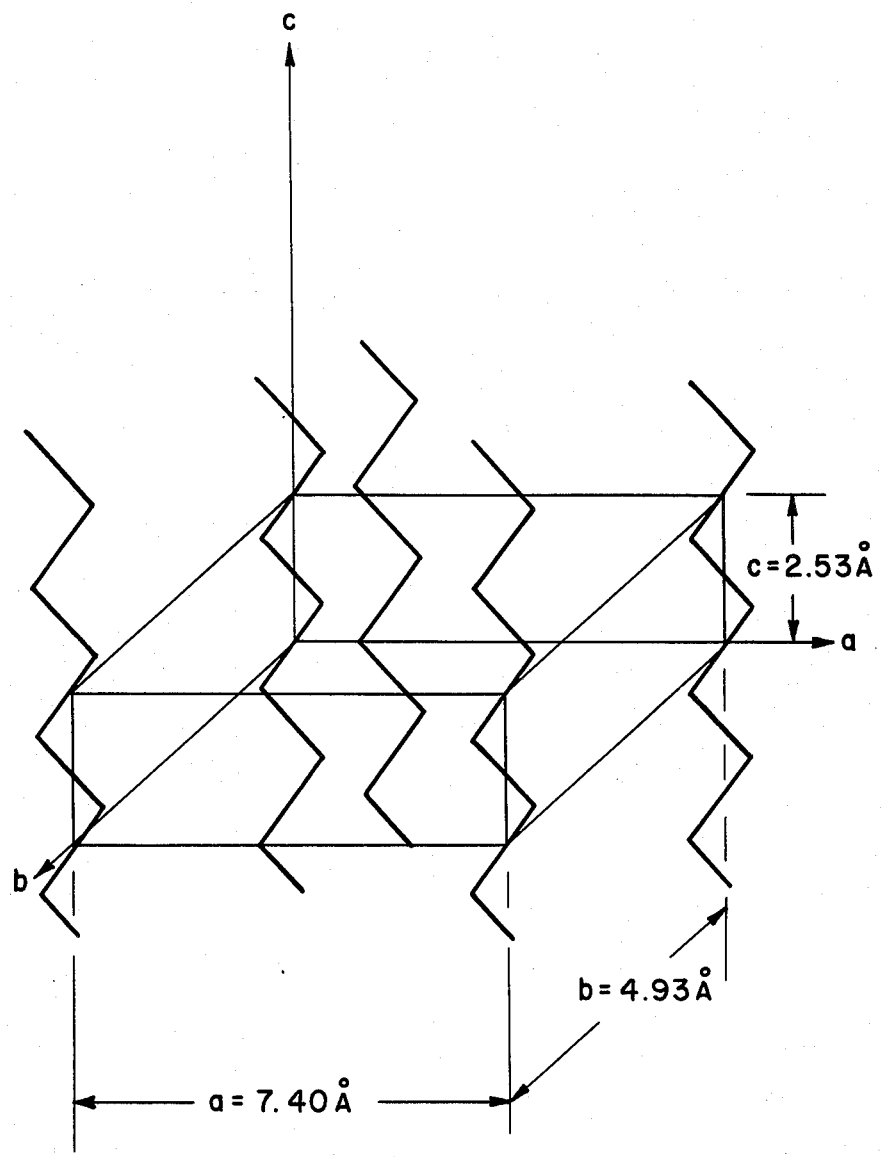

POLYMER FILMS CONTAINING PLATELET PARTICLES

This application is a division of application Ser. No. 405,225, filed Aug. 5, 1982 now U.S. Pat. No. 4,528,235.

DESCRIPTION

This invention relates to filled polymer films, more particularly this invention relates to films filled with high concentrations of platelet type filler to decrease gas and vapor permeability.

It is known that mineral particles can reduce the rate of the diffusion, and hence the permeability of gases and vapors through polymeric materials. The practical application of this effect has not been achieved in film, particularly thin films of low permeability.

Thin films which are resistant to the permeability of gases such as oxygen, and vapors such as water, are useful in packaging of sensitive foods, drugs and chemicals. Typically, the permeability to oxygen as measured by gas transmission rates normalized to one mil ($2.54 \times 10^{-3}$ cm) thick films at 25° C. should be no higher than about 3.0 cc per 100 square inches (645 cm$^2$) per day per atmosphere differential across film (measured by ASTM-Test D-1434-75 Method V at 50 psi (0.34 MPa)). The moisture permeability as measured by the Moisture Vapor Transmission rate (MVT) normalized to one mil ($2.54 \times 10^{-3}$ cm) thick film should be below 0.5 grams per 100 square inches (645 cm$^2$) per day (measured according to ASTM-E96 Procedure E) when measured at 100° F. (37.8° C.) with a 90% relative humidity differential across the film. Useful film to meet the requirements for packaging of foods, drugs and chemicals should have a total thickness of less than about 100 micrometers to be economical from a materials viewpoint. Further, such film should permit rapid heat penetration in sealing operations on packaging machines. The films must have sufficient physical properties to withstand the abuse of packaging and shipping operations without cracking.

It is known that plate-like shaped fillers are more effective than rod-like or spherical shaped fillers in lowering the rate of diffusion of gases and vapors through natural rubber, *Diffusion of Polymers*, Chapter 6, Academic Press, 1968. Great Britain Pat. No. 1,136,358 describes the use of mica in polyethylene or polystyrene to form a 125 micrometer pressed film. Other fillers disclosed in this Great Britain patent include graphite, talc and organic substances. French Pat. No. 1,299,089 discloses the use of mica in polyvinylidene chloride copolymers to reduce permeability. The use of talc, mica and other fillers in low density polyethylene films is disclosed in a publication by Helsinki University in Polymer Science and Engineering, Jan. 19, 1979. It was noted that low density polyethylene films containing such fillers were brittle when the mineral content was above 30% by weight.

SUMMARY OF THE INVENTION

The present invention relates to thin polymer films containing small particle sized platelet type filler. The films are from about 10 to 100, and preferably from 20 to 100, and more preferably 25 to 75 micrometers in thickness. The polymer has a melt index of from 0.01 to 10 grams per 10 minutes at 190° C. to 250° C. as measured on ASTM Test No. D-1238 at a load of 1000 to 2160 grams. The polymer can be any suitable polymer useful for forming thin films, and is preferably a polyamide which is more preferably polycaprolactam, or high density polyethylene. There is from 10 to 50, preferably 25 to 50, and most preferably 30 to 50 weight percent filler. The filler is a platelet type filler having an average equivalent diameter of about 1 to 8 micrometers, a maximum equivalent diameter of about 25 micrometers, and an average thickness of less than 0.5 micrometers, preferably from about 0.01 to 0.5, more preferably from 0.05 to 0.2 micrometers. The equivalent diameter is defined as the diameter of a circle having an area equal to the surface area of one broad surface face of the platelet shaped particle. The preferred filler is talc, which is magnesium silicate. The filler is homogeneously distributed through the film and a plane through the major plane of the filler particles is substantially parallel to the major plane of the film. The substantial parallelism can be determined by X-ray diffraction analysis.

The present invention also includes film laminates. The laminates have at least one polymeric layer, preferably high density polyethylene layer or a polyamide such as a polycaprolactam layer, and at least one additional polymeric layer. The at least one layer and preferably the at least one additional layer contain from 10 to 50, preferably 25 to 50, and more preferably 30 to 50 weight percent of a platelet type filler having an average equivalent diameter of about 1 to 8 micrometers, a maximum equivalent diameter of about 25 micrometers, and an average thickness of less than about 0.5 micrometers and preferably from 0.01 to 0.5 and more preferably 0.05 to 0.2 micrometers. The filler is homogeneously distributed through the film and a plane through the major plane of the filler particles is substantially parallel to the plane of the film.

A preferred film laminate has at least one talc filled high density polyethylene layer and at least one talc filled polycaprolactam layer. There can be an adhesive layer between the one layer and the additional layer. The one layer and the additional layer can be of adhesion promoting type polymers such as high amine end terminated polycaprolactam. The layers can contain additives which promote adhesion. For example, high density polyethylene layers can contain oxidized polyethylene to promote adhesion to the polyamide layer.

The present invention includes a process to make the film or film laminate as described above. The film or laminate is formed, preferably by extrusion through a die. The film laminate is preferably formed by coextrusion. The formed film is stretched in the machine direction (MD) or axial direction, and in the transverse direction (TD). The stretching of the film causes the major plane of the platelet type filler to be substantially parallel to the major plane of the film. A preferred process of stretching the film in the transverse direction is to extrude the film through a tubular film die and stretch the film in the transverse direction by blow forming the tubular film. The extent and sufficiency of parallelism of particles and film can be determined by X-ray analysis.

The present invention also includes a process of decreasing the gas and vapor permeability of a film. This process comprises the steps of homogeneously incorporating 10 to 50, preferably 25 to 50 and more preferably 30 to 50 weight percent of a platelet shaped filler into the thermoplastic film. The filler has an average diameter of from 1 to 8 micrometers, a maximum equivalent diameter of about 25 micrometers and a platelet thickness of 0.5 micrometers and preferably from 0.01 to 0.5, and more preferably 0.05 to 0.2 micrometers. The method includes the step of causing the filler to be directed so that a plane through the major plane of the platelet particles is substantially parallel to the major plane through the film.

BRIEF DESCRIPTION OF THE DRAWING

The accompanying drawing is a schematic diagram of a high density polyethylene crystal on coordinate system useful in X-ray analysis. Each zig-zag line represents a polymer molecule within the crystal.

DESCRIPTION OF THE PREFERRED EMBODIMENTS

The present invention is a polymeric film, a process to make the film, and a process of decreasing gas and vapor permeability of the film.

The film of the present invention comprises a polymer having a melt index of from 0.01 to 10 grams per 10 minute at 190° C. to 250° C. as measured on ASTM Test No. D-1238 at a load of 1000 to 2160 grams. The film contains from 10 to 50, and preferably 25 to 50, and more preferably 30 to 50 weight percent of a platelet type filler. The major plane of the film is the plane parallel to the broad face of the film. The film of the present invention is a thin film having a thickness of from 10 to 100, preferably 20 to 100, and more preferably 25 to 75 micrometers.

The term platelet filler is a filler having particles which have two broad, relatively flat opposite faces. The thickness of the particle is the distance between the faces which is relatively small compared to the size of the flat opposite faces. The filler shape is characterized by the particle thickness range and the equivalent diameter. The platelet type filler should have an average diameter of from 1 to 8, and preferably 1 to 5 micrometers, a maximum equivalent diameter of about 25 micrometers, and a thickness of less than 0.5 micrometers, and preferably from 0.01 to 0.5, and more preferably 0.05 to 0.2 micrometers. For the purposes of the present invention, equivalent diameter is defined as the diameter of a circle having an area equal to the surface area of one broad surface face of the platelet shaped particle. The equivalent diameter is determined from particle surface area as measured with a Leitz Texture Analyzer System in a fully computerized and automated mode. The filler is homogeneously distributed through the film. A plane through the major plane of each platelet filler is substantially parallel to the major plane of the film.

The present invention includes a film laminate having at least two layers of the filled polymer film of the present invention. Preferably, the polymer material in one layer and the polymer in at least one additional layer comprise different polymer materials. In this way advantage can be taken of the different gas and vapor permeability properties of diverse polymeric film materials.

The polymer film of the present invention can be made of any polymer which can be formed into a film, preferably by extrusion methods, and into which from 10 to 50 weight percent of the platelet type filler useful in the present invention can be homogeneously distributed. The film of the present invention can be formed into laminates with a variety of unfilled polymeric layers including those listed below.

The preferred polymers are polymers which can be formed into film by extrusion methods, and have an oxygen permeability as measured by gas transmission rates normalized to one mil ($2.54 \times 10^{-3}$ cm) thick film at 25° C. of about 5 cc or less per 100 in$^2$ (645 cm$^2$) per day per atmosphere, or a water vapor permeability as measured by gas transmission rates normalized to one mil ($2.54 \times 10^{-3}$ cm) thick film of about one gram or less per 100 in$^2$ per day at 90% relative humidity differential across the film at 100° F. (37.8° C.). The oxygen transmission rate is measured according to ASTM Test No. D1435-75 Method V at 50 psi (0.34 MPa) and the moisture transmission rate (MVT) is measured according to ASTM-E 96 Procedure E per mil (2.54 10$^{-3}$ cm) thickness.

Preferred polymers having low Moisture Vapor Transmission (MVT) include polyethylene having a density of 0.94 to 0.97 (high density polyethylene), ethylene tetrafluoroethylene copolymers, polychlorotrifluorethylene, copolymers and terpolymers of polychlorotrifluoroethylene including ethylene chlorotrifluoroethylene copolymers, fluoronated ethylene propylene copolymers, polyvinylidene chloride copolymers, and polypropylene.

Preferred polymers having low oxygen permeability include polyamides including polycaprolactam and polyhexamethylene adipamide, polyacrylonitrile copolymers, and ethylene vinyl alcohol copolymers.

Other polymers useful in the films of the present invention include polyvinyl chloride, polyvinyl alcohol, linear saturated polyesters such as polyethylene terephthalate and polybutylene terephthalate, and ionic copolymers including the salts of copolymers of ethylene and alpha,beta ethylenically unsaturated carboxylic acids including copolymers of ethylene and the salts of acrylic acid or methacrylic acid.

The most preferred polymers useful to form the filled films of the present invention include polyamides such as polycaprolactam and polyhexamethylene adipamide, and high density polyethylene.

Copolymers of ethylene and vinyl alcohol suitable for use in the present invention can be prepared by the methods disclosed in U.S. Pat. Nos. 3,510,464; 3,560,461; 3,847,845; and 3,585,177.

The ethylene vinyl alcohol copolymer can be hydrolyzed ethylene vinyl acetate copolymer. The degree of hydrolysis can range from 85 to 99.5%. The ethylene vinyl alcohol copolymer preferably contains from 15 to 65 mol percent ethylene and more preferably 25 to 50 mol percent ethylene.

The preferred polyamide useful in the present invention has a melt index of 0.01 to 10 grams/10 minutes, and preferably 0.5 to 10 grams/10 minutes as measured according to ASTM Test No. D-1238 at a load of 1000 grams at 235° C. The most preferred polyamide is polycaprolactam.

The polyethylene can be low density polyethylene, linear low density (low pressure) polyethylene, or high density polyethylene. The specific gravity range is from about 0.910 to 0.97. Low density polyethylene is commonly manufactured at high pressures of 15,000 psi (103 MPa) to 45,000 psi (310 MPa), using a free radical catalyst such as oxygen, peroxide or azo catalysts. The specific gravity of low density polyethylene is from about 0.910 to about 0.935.

Linear low density or low pressure polyethylene is manufactured at lower pressures by either the solution or gas phase process, using a coordination catalyst such as a Ziegler catalyst. The linear low density polyethylene has substantially less long chain branches than low density polyethylene. The specific gravity range of linear low density polyethylene is from about 0.915 to about 0.935.

High density polyethylene can be produced at 60° C. to 80° C., and pressures lower than 1500 psi (10.3 MPa) and as low as 100 psi (0.7 MPa), using a highly active catalyst. The usual catalyst is an alkyl metal derivative, such as triethyl aluminum, activated with titanium tetrachloride or another heavy metal derivative.

The preferred polyethylene is high density polyethylene having a specific gravity of 0.94 to 0.97 and preferably 0.96. The preferred high density polyethylene has a melt index of from 0.01 to 1.0 and preferably 0.05 to 0.8 grams per 10 minutes as measured on ASTM Test No. D-1238 using a load of 2160 grams at 190° C.

The fillers useful in the present invention are platelet type fillers having an average equivalent diameter of from 1 to 8, and preferably 1 to 5 micrometers, and a maximum equivalent diameter of about 25 micrometers and preferably 5 to 25 micrometers. The filler has a platelet thickness of less than 0.5 micrometers and preferably from 0.01 to 0.5, and more preferably 0.05 to 0.2 micrometers. Fillers useful in the present invention include but are not limited to talc, ground mica, platelet silicas, flaked metal, and flaked glass with talc being preferred.

The fillers used in the present invention can be coated with amino silane coupling agents or other substances commonly used to improve filler-polymer compatability of the type known in the art. Included in the amino silane coupling agents which are useful in the present invention are trialkoxysilane type agents. Specific examples of coupling agents include gamma-aminopropyltriethoxysilane, gamma-aminopropyltrimethoxysilane, gamma-aminopropylphenoldimethoxysilane, gamma-glycidoxypropyl tripropoxysilane, 3,3 apoxycyclohexolethyl trimethoxysilane, gamma-propionamido treithoxysilane, N-trimethoxysilypropyl-N(beta-aminoethyl) amine, N-trimethoxysilylundecylamine.

The platelet like filler useful in the present invention reduces the rate of diffusion of gases and vapors through the film. In order to achieve this, it is important that the fillers are homogeneously distributed through the film, and planes through the major plane of the filler are substantially parallel to the major plane of the film.

X-ray analysis is a useful way to describe the crystallinity and orientation of polymer crystals and the orientation of talc particles. A convenient method of X-ray analysis is that described in Hermans, P. H. and Weidinger A., Makromol Chemie, Vol. 44, pp. 24–36 (1961), hereby incorporated by reference. The use of this method with high density polyethylene is illustrated in Examples 14–16 below. The accompanying drawing shows a high density polyethylene crystal in a coordinate system useful in X-ray analysis.

For the purpose of the present invention Op, the platelet orientation factor is an indication of the platelet filler orientation in the film. The Op was determined by making azimuthal scans from densitometer tracings of the X-ray photographs which were obtained by exposing the edge of the film to the incident X-rays. The angle $\phi$ is the angle between the reference direction, the normal to the film, and the normal to the plane of interest, the major plane of the platlet. The Op values were calculated as the average cosine square ($<\cos^2\phi>$) for the normal to the flat faces of the platelet talc particles. An Op of 1.0 indicates that the faces of the platelets are completely parallel to the plane of the film. An Op of 0.0 indicates that the faces of the platelets are perpendicular to the plane of the film. The Op of the platelets in the film of the present invention is from 0.70 to 1.0, preferably 0.90 to 1.0, and most preferably 0.95 to 1.0.

Particularly useful films are high density polyethylene film and polycaprolactam film. High density polyethylene is readily extrudable. Unfilled high density polyethylene has a relatively low-permeability to moisture as measured by moisture vapor transmission rates normalized to one mil ($2.54 \times 10^3$ cm) thick film, about one gram per 100 in$^2$ (645 cm$^2$) per day per mil ($2.54 \times 10^{-3}$ cm) under ASTM E-96 Condition E procedures, at 100° F. (37.8° C.) with a 90% relative humidity differential across the film. Its oxygen permeability is relatively high. Polycaprolactam, also readily extrudable, has a low permeability to oxygen as measured by gas transmission rates normalized to one mil ($2.54 \times 10^{-3}$ cm) thick film, of less than 5 cc per 100 in$^2$ (645 cm$^2$) per day per atmosphere per mil at 25° C. measured according to ASTM-Test D-1435-75 Method V at 50 psi (0.34 MPa). The moisture vapor permeability of polycaprolactam film is high. The use of filler, preferably talc, reduces the permeability to moisture of the high density polyethylene and reduces the permeability of the polycaprolactam to oxygen. The result is that both high density polyethylene and polycaprolactam films become more useful for packaging oxygen and moisture sensitive products.

The present invention also includes laminates of film containing at least one polymer layer containing the filler of the present invention. Of particular interest are laminates containing different types of polymer layers filled with the platelet type filler used in the present invention. The most preferred films have at least one layer of high density polyethylene and/or one layer of polycaprolactam. A preferred film has a talc filled layer of high density polyethylene and a talc filled layer of polycaprolactam. The laminate can optionally have an adhesive layer such as an ethylene vinyl acetate copolymer modified with anhydride units between the high density polyethylene and polycaprolactam layer. Useful adhesive layers include Plexar ™ modified ethylene vinyl acetate copolymer produced by Chemplex, or CXA/3095 manufactured by DuPont. Alternately, no adhesive layer need be used, and a laminate of polycaprolactam adjacent to high density polyethylene can be made wherein the talc filled high density polyethylene also contains an adhesion promotor such as oxidized polyethylene as disclosed in U.S. Pat. No. 4,322,480 to attain adhesion between a polyamide layer and a polyethylene layer.

It is recognized that in addition to laminates having at least one layer and at least one additional diverse layer of the filled films of the present invention, the laminate can additionally have a variety of nonfilled film layers.

The film of the present invention contains from 10 to 50 percent by weight of a filler. The addition of the filler stiffens the film, decreases the tensile strength, and increases the tensile modulus. It has been found that the use of oriented platelet filler in the film of the present invention has an elongation break of greater than 50%, preferably from 50 to 500 and more preferably from 100 to 500%. The film and laminates of the present invention are self supporting.

The present invention includes a process to make the film of the present invention. In the preferred method polymer and filler to be made into the film are blended. A preferred method to homogeneously distribute the filler through the polymer material is to melt blend it. Preferably, the melt blending can take place in a mixing type of an extruder. The extrudate can be used to form a film directly. Alternately, the extrudate can be cooled, pelletized, and remelted later to form a film. Other methods for homogeneously distributing the filler through polymer include polymerizing the polymer in the presence of the filler and premixing the filler with powdered polymer prior to melt blending in an extruder, Banbury mixer, or heated two roll mill.

The homogeneously distributed filler and polymer are formed into a film by suitable film forming methods. Typically, the composition is melted and forced through a film forming die. The die can be a flat die or a circular die. A typical flat die is a hanger shaped die, and a typical circular die is a tubular film die.

The sheet of the filled polymer material of the present invention goes through steps to cause the platelets to be distributed in the film so the major plane through the platelets are substantially parallel to the major plane through the film. The method to do this is to biaxially stretch the film. The film is stretched in the axial or machine direction by tension rollers pulling the film as it is extruded from the die. The film can be stretched in the transverse direction by clamping the film in manners known in the art. Alternately, and preferably, the film is stretched in the transverse direction by using a tubular film die and blowing the film up as it passes from the tubular film die. The biaxially stretching of the film forces the platelets into a configuration so that a plane through the major plane of the platelets is substantially parallel to the film. When the film is extruded through a tubular film die and blown up, it is preferred to blow the film up so that the diameter increases from the die diameter 1.2 to 6 times and preferably 2 to 5 times. The axial stretch can be calculated knowing the die gap thickness and the stretch or blowup in the transverse direction. Preferably the axial stretch ratio is from 1.2 to 1 to 6 to 1 using die gaps of from 25 to 1000 micrometers.

It has been found that for the platelets to be forced to align substantially parallel to the major plane of the film, the film should be made of a polymer having melt index of from 0.01 to 10 grams per 10 minutes at 190° C. to 250° C. as measured on ASTM Test No. D-1238 at a load of 1000 to 2160 grams. Polymers having a melt index in this range exert sufficient shear stress on the filler platelets during biaxially stretching to cause the platelet fillers to be substantially parallel to the major plane of the film.

Film laminates of the present invention can be made in a manner similar to make the film as described above. Instead of extruding a single film from the film die, two or more film layers with at least one layer being a filled layer in the manner of the present invention can be coextruded. To take maximum advantage of the natural permeability of the various polymers available, it is preferred to coextrude at least one layer of one polymer and an additional layer of a different polymer. The coextruded films are biaxially stretched in the manner described above with regard to the single film layers.

The present invention includes a process of decreasing gas and vapor permeability of films and film laminates of the type described above. This process includes homogeneously incorporating platelet shaped fillers into the polymer film. Preferably, the polymer has a melt index of from 0.01 to 10, and more preferably 0.05 to 2.0 grams per 10 minutes, at 190° C. to 250° C., using a load of 1000 to 2160 grams as measured on ASTM Test No. D-1238. These polymers combined with the small size of the platelet fillers facilitates the parallel alignment of the fillers in the major film plane. Preferably, the platelet thicknesses are less than 0.5 micrometers, more preferably from 0.01 to 0.5, and most preferably 0.05 to 2.0 micrometers. This platelet thickness is important because the films themselves are very thin. The platelet average equivalent diameter is from 1 to 8 and preferably 1 to 5 micrometers, and the maximum equivalent diameter is about 25 micrometers.

Polymers which are resistant to permeation by particular gases and vapors when unfilled are preferred. In this way, the film or film laminate containing the platelet particles has even more improved permeation resistance to the gas or vapor that the film itself is naturally resistant to, and in addition improved permeation to other gases and vapors. Preferred polymers are those that form unfilled films which have an oxygen permeability as measured by gas transmission rates normalized to one mil ($2.54 \times 10^{-3}$ cm) thick film at 25° C. of about 5 cc or less per 100 in$^2$ (645 cm$^2$) per day per atmosphere per mil ($2.54 \times 10^{-3}$ cm) thickness (ASTM-Test No. D-1434-75 method V) at 50 psi (0.34 Mpa) or a moisture permeability as measured by moisture vapor transmission rates normalized to one mil ($2.54 \times 10^{-3}$) thick film of about one gram or less per 100 in$^2$ (645 cm$^2$) per day per mil ($2.54 \times 10^{-3}$ cm) thickness (ASTM E-96, Procedure E). For this reason, polyamide, which is resistant to oxygen permeation, or high density polyethylene, which is resistant to moisture permeation, are particularly preferred. Talc is the preferred filler material because it is readily available, acceptable for food contact, and reasonably priced. The use of the platelet fillers and process of this invention reduces the permeability to ranges suitable to package many sensitive foods, drugs and other materials.

The fact that the major plane of filler platelets is substantially parallel to the plane of the film has been verified and is discussed in detail in the examples which follow. Additionally, it has been found that stretching the film in the transverse direction results in improvement of tensile elongation at break in the transverse direction. This was particularly found to be the case when using blow-up ratios in the transverse direction of greater than 2 to 1 and preferably from 2 to 1 to about 5 to 1. The blow-up ratios are linear so that when using a tubular die, the blow-up diameter is increased from 2 to 5 times.

Several examples are set forth below to illustrate the nature of the invention and the manner of carrying it out. However, the invention should not be considered as being limited to the details thereof.

EXAMPLES 1-3

Single films were formed from high density polyethylene having a density of 0.96 and the melt index of 0.7 g/10 minutes as measured on ASTM Test No. D-1238 at a load of 2160 grams, at 190° C. The film was filled with talc produced by Pfizer Minerals, Pigments and Metals Div., N.Y., N.Y. as Microtalc MP10-52. The talc chemical analysis indicates primarily silicon dioxide and magnesium oxide. The talc had an average "equivalent particle diameter" of 1.3 micrometers and a maximum equivalent diameter of 9.3 micrometers. The platelet thickness of the particles was about 0.1 microns. The talc was blended into the high density polyethylene by first premixing the polyethylene in powder form with the talc. The powder mixture was melt blended to 138° C. (280° F.) to 149° C. (300° F.) for 5 to 7 minutes on a two roll mill. The mixture was removed from the mill in sheet form and ground to 10 to 20 mesh granules. The density was measured according to ASTM D-1505. Films of about 50 micrometers thickness were extruded at 216° C. (420° F.) through a tubular film die having a diameter of 7.6 cm (3 inches). The film was blown up to 12.7 cm (5 inches) so that the blow-up ratio was 1.6. The film was stretched about 300% in the machine or axial direction as estimated from the total film thickness change from the die gauge 254 micrometers (10 mils) to the final film thickness of about 2 mils (50 micrometers).

The weight percent of talc in the film was varied as indicated in Table 1. The Moisture Vapor Transmission rate (MVT) in grams of moisture passing through 100 square inches (645 cm$^2$) in 24 hours was measured according to ASTM-E-96, Condition E. The MVT values were normalized to a one mil (2.54×10$^{-3}$ cm) thickness basis in Table 1. The results are shown in Table 1.

TABLE 1

|  | Talc (Wt. %) | Density (g/cc) | MVT |
|---|---|---|---|
| Comp. 1 | 0 | 0.96 | 0.81 |
| Ex. 1 | 17 | 1.26 | 0.55 |
| Ex. 2 | 23 | 1.36 | 0.44 |
| Ex. 3 | 29 | 1.46 | 0.57 |

The use of talc filler between 17 and 29 percent in a film wherein there is a blow-up of 1.6 in a transverse direction results in an improvement in resistance to the permeation of moisture.

EXAMPLES 4-6

A film was made from high density polyethylene having a density of 0.96 and a melt index of 0.3 grams per 10 minutes as measured in Example 1. Blown tubular films were made by the procedure described with reference to Example 1. The thickness of the films was from about 25 to 33 micrometers. The high density polyethylene was filled with talc of the type disclosed with regard to Example 1, and the film was extruded in the same manner as described with reference to Example 1. The film had a blow-up ratio of 1.6 in the transverse direction. The tensile properties were measured in the machine direction according to ASTM D-638. The MVT values were determined in the same manner as in Example 1 and reported normalized to one mil (2.54×10$^{-3}$ cm) thick film. The results are summarized in Table 2.

TABLE 2

|  | Talc (Wt. %) | Density (g/cc) | MVT | Ten. Str. psi (MPa) | Ten. Mod. psi (MPa) | Brk. Elong. (%) |
|---|---|---|---|---|---|---|
| Comp. 2 | 0 | 0.96 | 0.99 | 5100 (35.2) | 229,000 (1579) | 500 |
| Ex. 4 | 23 | 1.36 | 0.69 | 3600 (24.8) | 358,000 (2468) | 470 |
| Ex. 5 | 29 | 1.46 | 0.56 | 3700 (25.5) | 375,000 (2585) | 395 |
| Ex. 6 | 33 | 1.53 | 0.48 | 3400 (23.4) | 398,000 (2744) | 255 |

The resistance to permeation of moisture continued to improve with the addition of the talc from 23 to 33% by weight.

EXAMPLES 7-9

A film was made using high density polyethylene having a density of 0.96 and a melt index of 0.7 g/10 minutes measured in the manner disclosed in Example 1. The same type of talc and process to make the film was used in Examples 7-9 as was used in Example 1. The blown films of Examples 7-9 had a thickness of 30 micrometers. The thickness of the film in Comp. 3 was 28 micrometers. Physical properties and MVT normalized to film one mil (2.54×10$^{-3}$ cm) thick were measured in the same manner as in Example 4. The results are summarized in Table 3.

TABLE 3

|  | Talc (Wt. %) | Density (g/cc) | MVT | Ten. Str. psi (MPa) | Ten. Mod. psi (MPa) | Brk. Elong. (%) |
|---|---|---|---|---|---|---|
| Comp. 3 | 0 | 0.96 | 0.94 | 4200 (29.0) | 193,000 (1331) | 650 |
| Ex. 7 | 23 | 1.36 | 0.64 | 3200 (22.1) | 330,000 (2275) | 440 |
| Ex. 8 | 29 | 1.46 | 0.58 | 3100 (21.4) | 365,000 (2517) | 270 |
| Ex. 9 | 33 | 1.53 | 0.52 | 3200 (22.1) | 344,000 (2372) | 250 |

EXAMPLES 10-13

A film was prepared from high density polyethylene copolymerized with less than 1% of hexene. The copolymer has a density of 0.95 and a melt index of 0.08 g/10 minutes measured in accordance with the procedure disclosed in Example 1. The films were produced using the process described in Example 1. The thickness of the films was about 50 micrometers. The talc concentration was 29%. The talc "average equivalent particle diameter" in micrometers was varied. The minimum equivalent diameter and maximum equivalent diameters are also listed in Table 4. In all cases, the film had a density at 1.45. The tensile properties and MVT normalized to one mil (2.54 cm×10$^{-3}$ cm) thick film were measured using the same procedure as used in Example 4. The results are summarized in Table 4.

TABLE 4

|  | Talc dia avg. | min. | max. | MVT | Ten. Str. psi (MPa) | Ten. Mod. psi (MPa) | Brk. Elong. (%) |
|---|---|---|---|---|---|---|---|
| Comp. 4 | — | — | — | 0.93 | 5000 (34.5) | 160,000 (1103) | 580 |
| Ex. 10 | 3 | 0.8 | 12 | 0.44 | 4500 (31.0) | 280,000 (1931) | 460 |
| Ex. 11 | 5 | 0.8 | 20 | 0.50 | 4100 (28.3) | 240,000 (1655) | 480 |
| Ex. 12 | 8 | 0.8 | 25 | 0.52 | 2800 (19.3) | 242,000 (1669) | 350 |
| Ex. 13 | 14 | 0.8 | 56 | 0.77 | 1850 (12.8) | 171,000 (1179) | 90 |

A review of Table 4 shows that tensile properties and resistance to moisture permeability improved with a decrease in particle size. The preferred particle size is the particle size used in Example 10 where the talc has an "average particle diameter" of 3 micrometers. When using talc having a particle size of 14 micrometers, there is a significant step up in the amount of moisture permeation through the film and a drop in film toughness as measured by the breaking elongation.

EXAMPLES 14-16

The polymer used in Example 10 was formed into a film with various concentrations of talc as summarized in Table 5. The talc was of the same type used in Example 1 and blown films were made having an average thickness of 38 micrometers. The procedure used was the same as that in Example 1. The MVT normalized to one mil ($2.54 \times 10^{-3}$ cm) thick film and physical properties as measured by the procedure of Example 4 are summarized in Table 5.

TABLE 5

|  | Talc | Density (g/cc) | MVT | Ten. Str. psi (MPa) | Ten. Mod. psi (MPa) | Brk. Elong. (%) |
|---|---|---|---|---|---|---|
| Comp. 5 | 0 | 0.95 | 1.24 | 5000 (34.5) | 163,000 (1124) | 580 |
| Ex. 14 | 29 | 1.45 | 0.85 | 4000 (27.6) | 291,000 (2006) | 500 |
| Ex. 15 | 33 | 1.53 | 0.76 | 3600 (24.8) | 360,000 (2482) | 330 |
| Ex. 16 | 38 | 1.62 | 0.67 | 4000 (27.6) | 335,000 (2310) | 370 |

A review of Table 5 shows an improvement in permeation resistance with the increase in the weight percent of talc. There was an increase in tensile modulus while retaining high breaking elongation and hence high toughness as the amount of talc went from 0 to 38 percent.

X-ray analyses were performed on blown film to describe the talc orientation and crystallinity of the polyethylene in accordance with the procedure of Hermans and Weislinger referenced above. Flat plate X-ray photographs were taken on all the films with a Unicam camera with Cu K radiation. Quantitative data were obtained from diffractometer scans in the transmission mode. Crystallinity measurements were made from fast rotational scans in order to "randomize" the X-ray patterns. Scans were made from $2\theta = 12°$ to $2\theta = 30°$. A crystalline index (CI) was calculated from the relative areas of the crystalline peaks to an amorphous background after drawing in a suitable background for the amorphous area. The crystallographic axes for polyethylene are $c = 2.53 \text{Å}$ (chain direction), $b = 4.93 \text{Å}$ and $a = 7.40 \text{Å}$ (see drawing). The degree of orientation of the polyethylene crystallites was determined in terms of the degree of orientation of the normals to the 200 plane (a-axis) and the 020 plane (b-axis). The angle O is the angle between a reference direction and the normal to the plane of interest in X-ray terminology. For the purpose of the present invention $\phi$ will relate to platelet orientation and $\phi'$ will relate to crystal orientation. The mean-squared cosines ($<\cos^2\phi'>$) of the half-widths of the 200 ($2\theta = 24.3°$) and the 020 ($2\theta = 36.5°$) reflections were functions used to describe the crystallite orientations. These were obtained from azimuthal scans of the $2\theta = 24.3°$ and $2\theta = 36.5°$ reflections. The 020 orientation parameters in talc-filled polyethylene were obtained from edge on photographs. All the other polyethylene orientation data were obtained from diffractometer scans.

Films made with low blow-up ratios from Examples 6, 9 and 15 where the blow-up ratio was about 1.6:1 were highly oriented as evidenced by the small spread of the 200 and 020 reflections.

TABLE 6

|  | % Talc | CI % | Polyethylene Orientation $<\cos^2\phi'>$ a-axis | b-axis |
|---|---|---|---|---|
| Comp. 2 | 0 | 70 | 0.89 | 0.97 |
| Ex. 6 | 33 | 75 | 0.81 | 0.86 |
| Comp. 3 | 0 | 65 | 0.89 | 0.96 |
| Ex. 9 | 33 | 72 | 0.87 | 0.86 |
| Comp. 5 | 0 | 64 | 0.87 | 0.96 |
| Ex. 15 | 33 | 73 | 0.92 | 0.90 |

The orientation functions given in the Table 6 above represent the distribution about the mean positions. The b-axis of the polyethylene crystal (which is normal to the polyethylene chain direction) is aligned normal to the machine direction in the blown films which do not contain talc. Since the b-axis is also normal to the 020 planes in the crystal, the 020 planes are aligned parallel to the machine direction. The a-axis (which is normal to the 200 planes) is approximately 45° to the machine direction. Since the a-axis and b-axis are normal to the polyethylene chain direction (c-axis), then the c-axis, or chain direction is at some angle to the machine direction. The results shown in Table 6 indicate that the crystallinity is increased by the presence of the talc and the orientation of the polyethylene crystals decreases. This further improves resistance to gas and vapor permeability.

EXAMPLES 17-19

Films were produced from polycaprolactam and talc filler. The talc used was the same type as used in Example 1. The polycaprolactam resin had a m-cresol solution viscosity of 2.5 and a melt index of 1.0 grams per 10 minutes as measured on ASTM Test No. D-1238 at 1000 gram load at 235° C. The films were extruded through a 4-inch (10.16 cm) diameter tubular die using extrusion temperatures of about 266° C. (510° F.) The films were blown up to about 8 (20.32) inches in diameter and had a thickness of about 50 micrometers. The permeability to oxygen as measured by gas transmission rates normalized to one mil ($2.54 \times 10^{-3}$ cm) thick of the films was measured at 25° C. as cubic centimers per 100 square inches (645 cm$^2$) per day on a one mil ($2.54 \times 10^{-3}$) thick basis. The MVT normalized to one mil ($2.54 \times 10^{-3}$ cm) thick film and the tensile properties of the films were measured according to the procedure used in Example 4. Tensile properties were measured in the machine or extrusion direction. The results are summarized in Table 7.

TABLE 7

|  | Talc | Density (g/cc) | O$_2$ Trans. | MVT | Ten. Str. psi (MPa) | Ten. Mod. psi (MPa) | Brk. Elong. (%) |
|---|---|---|---|---|---|---|---|
| Comp. 6 | 0 | 1.13 | 1.42 | 9.3 | 11,600 (80.0) | 149,000 (1027) | 350 |
| Ex. 17 | 20 | 1.44 | 0.71 | 4.6 | 9,600 (66.2) | 448,000 (3089) | 280 |
| Ex. 18 | 30 | 1.60 | 0.81 | 3.5 | 8,600 (59.3) | 572,000 (3944) | 260 |

TABLE 7-continued

|       | Talc | Density (g/cc) | O₂ Trans. | MVT | Ten. Str. psi (MPa) | Ten. Mod. psi (MPa) | Brk. Elong. (%) |
|-------|------|----------------|-----------|-----|---------------------|---------------------|-----------------|
| Ex. 19 | 40   | 1.76           | 0.43      | 3.3 | 7,000 (48.3)        | 657,000 (4530)      | 170             |

EXAMPLES 20-22

Examples 17 through 19 were repeated using talc produced by Cyprus Industrial Minerals Co., L.A., California as Cyprusbond ™ talc. The talc chemical analysis resulted primarily in silicon dioxide and magnesium oxide. The mineral analysis was about 98% 3 MgO-4 SiO₂-H₂O. The talc had an average diameter of 1.5 micrometers, with a minimum size of about 0.1 micrometers and a maximum size of 20 micrometers. The talc was coated with a gamma aminopropyltriethoxysilane made by Union Carbide as type A-1100. The oxygen transmission, moisture transmission and physical properties were measured according to the same procedures used in Examples 17-19. The results are summarized in Table 8 below.

TABLE 8

|         | Talc (Wt. %) | Density (g/cc) | O₂ Trans. | MVT | Ten. Str. psi (MPa) | Ten. Mod. psi (MPa) | Brk. Elong. (%) |
|---------|--------------|----------------|-----------|-----|---------------------|---------------------|-----------------|
| Comp. 7 | 0            | 1.13           | 1.42      | 9.3 | 11,600 (80.0)       | 149,000 (1027)      | 350             |
| Ex. 20  | 20           | 1.44           | 0.88      | 4.9 | 8,200 (56.5)        | 431,000 (2972)      | 210             |
| Ex. 21  | 30           | 1.60           | 0.81      | 4.2 | 8,000 (55.2)        | 521,140 (3593)      | 140             |
| Ex. 22  | 40           | 1.76           | 0.57      | 3.9 | 7,800 (53.8)        | 522,000 (3599)      | 130             |

EXAMPLES 23-24

High density polyethylene of the type used in Example 1 having a melt index of 0.7 and high density polyethylene copolymerized with less than 1% of hexene of the type used in Example 10 were formed into films for Examples 23 and 24, respectively. The films contain 29 weight percent of talc of the type used in Example 1. The films produced were approximately 29 micrometers thick. The films were extruded through a circular die 5.5 inches in diameter and blown up to produce a film 23 inches in diameter so that the blow-up ratio was 4.2 to 1.0. The films were extruded at temperatures of about 450° F. The expansion point of the film bubble was about 35 inches above the die. The moisture vapor transmission rate was measured using the same procedure as in Example 1. The moisture vapor transmission rate as measured in grams per 100 square inches (645 cm²) per 24 hours for 1 mil (2.54×10⁻³ cm) thickness of film is summarized in Table 9 below. The platelet orientation factor $O_p$ was determined by making azimuthal densitometer scans from densitometer tracings of the X-ray photographs which were obtained by exposing the edge of the film to the incident X-rays. The $O_p$ values were calculated as the average cosine square ($<\cos^2\phi>$) for the normal to the flat faces (the 001 planes) of the platelet talc particles. Crystal orientation is also indicated. The results are summarized in Table 9.

TABLE 9

|         | Melt Index | Talc % Wt. | Density | MVT  | CI % | Op   | $<\cos^2\phi'>$ a-axis | $<\cos^2\phi'>$ b-axis |
|---------|------------|------------|---------|------|------|------|------------------------|------------------------|
| Comp. 8 | 0.7        | 0          | 0.96    | 0.99 | 69   | —    | 0.83                   | 0.91                   |
| Ex. 23  |            | 29         | 1.46    | 0.77 | 75   | 0.95 | 0.80                   | 0.91                   |
| Comp. 9 | 0.08       | 0          | 0.95    | 1.36 | 66   | —    | 0.81                   | 0.91                   |
| Ex. 24  |            | 29         | 1.45    | 0.78 | 71   | 0.96 | —                      | 0.91                   |

As is evident from Table 9, talc particles were found to be oriented with flat platelet faces being parallel to the plane of the film. Platelet surface orientation factors ($O_p$) of 0.95 and 0.96 were obtained. The increase in polyethylene crystallinity caused by nucleation with talc and a high planar orientation of the talc particles are two factors which produce the lowering of the moisture vapor permeation. Both increased crystallinity and platelet orientation introduce a greater path length for water molecules and give the filled polyethylene film a much higher "apparent thickness." The tensile strength and break elongations in both machine direction (MD) and transverse direction (TD) were markedly improved, reflecting the high degree of orientation of the talc platelets in the film plane and the more random orientation of the b-axis of the polyethylene crystals. The importance of the orientation to physical properties is illustrated in Table 10 below. The tensile properties were measured by the same procedure used in Example 4.

TABLE 10

|        | Resin Melt Index | Density | Blow-up Ratio | Ten. Str. psi (MPa) MD | Ten. Str. psi (MPa) TD | Brk. El. (%) MD | Brk. El. (%) TD |
|--------|------------------|---------|---------------|------------------------|------------------------|-----------------|-----------------|
| Ex. 14 | 0.08             | 0.95    | 1.6:1         | 3980 (27.4)            | (1)                    | 500             | (1)             |
| Ex. 23 | 0.08             | 0.95    | 4.2:1         | 6590 (45.4)            | 5670 (39.1)            | 450             | 580             |
| Ex. 8  | 0.7              | 0.96    | 1.6:1         | 3090 (21.3)            | (1)                    | 270             | (1)             |
| Ex. 24 | 0.7              | 0.96    | 4.2:1         | 4300                   | 5050                   | 400             | 30              |

TABLE 10-continued

| Resin Melt Index | Density | Blow-up Ratio | Ten. Str. psi (MPa) MD | TD | Brk. El. (%) MD | TD |
|---|---|---|---|---|---|---|
| | | | (29.6) | (34.8) | | |

(1) In the transverse direction (TD) the film broke with less than 10% elongation, at the yield point.

EXAMPLE 25

Films were produced by tubular coextrusion of high density polyethylene-hexene copolymer described in Example 10 containing 29% talc of the type described in Example 1 as the outer layer, an ethylene-vinyl acetate polymer modified with anhydride units as the middle layer (DuPont CXA-3095), and polycaprolactam of the type described in Example 17 containing 30% talc of Example 1 as the inner layer.

Films of 36 inch flattened tubular width were produced using a die of 8 inches (20.32 cm) in diameter, corresponding to a blow-up ratio of 2.8 to 1. The total thickness of the three layer film was about 63 microns with 25 micrometers as nylon, 32 micrometers as high density polyethylene and the remainder as the adhesive layer.

The coextrusion die contained three separate channels and was maintained at about 243° C. (470° F.). The three layer film laminate had strong adhesion between all the layers with high stiffness and strength. The following film properties were measured according to the above described test procedures in Example 17:

MVT, 0.43 grams/100 in.$^2$ (645 cm$^2$)/24 hr;
O$_2$ permeability, 1.3 cc/100 in.$^2$ (645 cm$^2$)/24 hr;
Tensile Elongation, 145% in the extrusion direction; and
Tensile Modulus, 235,000 psi (1620 MPa) in the extrusion direction.

EXAMPLE 26

A five layer tubular film was produced using 0.95 density polyethylene of the type described in Comp. 4 having a melt index 0.08 g/10 minutes as measured in accordance with the procedure of Example 1. The polyethylene was free of talc and contained 2.7% by weight titanium dioxide pigment. This resin was used to form the innermost (layer one) and outermost layer (layer five) of the film. Polycaprolactam resin containing 30% talc of the type described in Example 1 was used to form the middle layer (layer three). Adhesive layers two and four were formed from CXA-3095 modified ethylene-vinyl acetate resin described in Example 25. The tubular die comprised five concentric channels which merge at the top of the die to an exit channel 12 inches (30.48 cm) in diameter. Channels one and five corresponding to film layers one and five were supplied with molten high density polyethylene from a 2½ inch (6.35 cm) extruder operated at about 22.7° C. (440° F.).

Channels two and four corresponding to adhesive layers two and four were supplied with molten CXA-3095 resin from a 1¾ inch (4.4 cm) extruder operated at 210° C. (410° F.). The middle channel three was fed with molten talc-modified polycaprolactam from a 2½ inch (6.35 cm) extruder operated at 260° C. (500° F.) to form layer three. The five layer die was maintained at about 260° C. (500° F.). Five layer film was produced at a film speed of about 45 feet per minute (13.7 m/min) with a blow-up ratio of 1.3 to 1. The total film thickness was about 45 micrometers with the two high density polyethylene layers being about 12 micrometers each, the polycaprolactam layer about 12 micrometers and the remainder, 9 micrometers, composed of the two adhesive layers. The oxygen transmission was 3.4 per 100 in$^2$ (645 cm$^2$) per day per atmosphere, and the moisture transmission permeability 0.51 grams per 100 in$^2$ per day, as measured by the procedure in Example 17 and normalized to one mil (2.54×10$^{-3}$ cm$^2$).

While exemplary embodiments of the invention have been described, the true scope of the invention is to be determined from the following claims.

What is claimed:

1. A film having at least one layer comprising:
a polyamide having a melt index of from 0.01 to 10 g/10 minutes as measured on ASTM D-1238 at 1000 gram load at 235° C., and from 10 to 50 weight percent of a platelet filler wherein the filler has an average equivalent diameter of from 1 to 8 micrometers, a maximum diameter of 25 micrometers, and a thickness of less than 0.5 micrometers, the filler being homogeneously distributed through the film and substantially parallel to the plane of the film, the film being from 10 to 100 micrometers in thickness.

2. The film as recited in claim 1 wherein the polyamide is polycaprolactam.

3. The film as recited in claim 1 wherein the film contains from 30 to 50 weight percent of the filler.

4. The film as recited in claim 1 wherein the filler is talc.

5. The film as recited in claim 1 wherein the film contains from 25 to 50 weight percent of the talc.

6. The film as recited in claim 1 wherein the maximum equivalent diameter of the talc is from 5 to 25 micrometers.

7. The film as recited in claim 1 wherein the average diameter of the talc is from 1 to 5 micrometers.

8. The film as recited in claim 1 wherein the platelet orientation factor $O_p$ of the filler is from 0.9 to 1.0.

9. A film laminate comprising at least one layer of the film recited in claim 1.

10. The film as recited in claim 1 having a break elongation of greater than about 50 percent.

11. The film as recited in claim 10 having a break elongation of from 100 to 500 percent.

* * * * *